United States Patent
Gatewood et al.

(10) Patent No.: US 9,496,949 B2
(45) Date of Patent: Nov. 15, 2016

(54) APPLICATION DEDICATED TRANSCEIVER COMMUNICATIONS

(71) Applicant: Sprint Communications Company L.P., Overland Park, KS (US)

(72) Inventors: John Gatewood, Lee's Summit, MO (US); Sunny R. Dubey, Sunnyvale, CA (US); Bhanu Prakash Voruganti, Overland Park, KS (US); Matthew P. Hund, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 202 days.

(21) Appl. No.: 14/104,022

(22) Filed: Dec. 12, 2013

(65) Prior Publication Data
US 2015/0171954 A1    Jun. 18, 2015

(51) Int. Cl.
| | |
|---|---|
| H04B 7/24 | (2006.01) |
| H04B 7/26 | (2006.01) |
| H04L 29/08 | (2006.01) |
| H04B 1/00 | (2006.01) |
| H04B 1/38 | (2015.01) |

(52) U.S. Cl.
CPC ........... *H04B 7/26* (2013.01); *H04L 69/32* (2013.01); *H04B 1/0003* (2013.01); *H04B 1/38* (2013.01)

(58) Field of Classification Search
CPC ....... H04W 16/14; H04B 1/003; H04B 1/38; H04B 7/26
USPC .......................................................... 455/39
See application file for complete search history.

(56) References Cited

U.S. PATENT DOCUMENTS

| | | | |
|---|---|---|---|
| 7,055,152 B1 | 5/2006 | Ganapathy | |
| 8,060,594 B1 * | 11/2011 | Clavel et al. | 709/223 |
| 8,331,907 B2 | 12/2012 | Jiang | |
| 2003/0037171 A1 | 2/2003 | Madineni et al. | |
| 2003/0158974 A1 * | 8/2003 | Herrod et al. | 709/328 |
| 2008/0240154 A1 * | 10/2008 | Oved | H04L 69/16 370/466 |
| 2011/0195699 A1 * | 8/2011 | Tadayon et al. | 455/418 |
| 2012/0106528 A1 * | 5/2012 | Estevez | H04W 88/06 370/338 |

FOREIGN PATENT DOCUMENTS

| | | |
|---|---|---|
| EP | 2529577 | 7/2011 |
| EP | 2469935 | 6/2012 |
| WO | 2008117272 | 10/2008 |
| WO | 2011091227 | 7/2011 |

\* cited by examiner

*Primary Examiner* — Wesley Kim
*Assistant Examiner* — Raj Chakraborty

(57) ABSTRACT

Examples disclosed herein provide systems, methods, and software for application dedicated transceivers. In one example, a method for operating a wireless device includes, in a device application, initiating a request for a dedicated-transceiver. In response to the request, the method further includes, in the device operating system, requesting dedicated-transceiver information from a transceiver system on the device and, once the information is received from the transceiver system, transferring a dedicated-transceiver response to the application. The method also provides, in the device application, initiating a communication handshake with the transceiver system and, upon completion of the handshake, communicating application data to the transceiver system without the use of the operating system.

20 Claims, 4 Drawing Sheets

APPLICATION DEDICATED TRANSCEIVER COMMUNICATIONS

TECHNICAL BACKGROUND

Wireless communication devices typically include applications and other software that communicate with base stations using various wireless communication formats. These applications include weather applications, file-sharing applications, email serving applications, internet access applications, among other possible applications on the wireless device. In operation, the applications on the wireless device execute using an operating system such as Android, iOS, Linux, Windows, or some other operating system. These operating systems provide frameworks and other elements that allow the applications to work with the device hardware.

In some instances, the various applications on the wireless communication device may require a communication. This communication may include sending data across the network or receiving data from the network. To accomplish these tasks, the application may transfer application data to the operating system, which in turn communicates with various transceivers on the device to communicate the data. Thus, the operating system may provide an essential intermediary between the application and the various transceivers.

Overview

Examples disclosed herein provide systems, methods, and software for application dedicated transceivers. In one example, a method for operating a wireless device includes, in a device application, initiating a request for a dedicated-transceiver. In response to the request, the method further includes, in the device operating system, requesting dedicated-transceiver information from a transceiver system on the device and, once the information is received from the transceiver system, transferring a dedicated-transceiver response to the application. The method also provides, in the device application, initiating a communication handshake with the transceiver system and, upon completion of the handshake, communicating application data to the transceiver system without the use of the operating system.

In another example, a wireless communication device for secure communication includes an application configured to communicate a dedicated-transceiver request to a device operating system, receive a dedicated-transceiver response from the device operating system, initiate a communication handshake with a transceiver system, and communicate secure communication data to the transceiver system without utilizing the operating system. The system further includes the device operating system configured to receive the dedicated-transceiver request from the application, request dedicated-transceiver information from the transceiver system, and communicate the dedicated-transceiver response to the application based on the dedicated-transceiver information. The system also includes the transceiver system configured to identify the dedicated-transceiver information, communicate the dedicated-transceiver information to the device operating system, respond to the communication handshake from the application, and receive the secure communication data from the application.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Wireless communication devices typically include applications that require connections over a communication network. These applications include weather applications, email applications, game applications, amongst other possible applications. When a communication is required, the present disclosure suggests systems and methods to provide an application with wireless communications by connecting the application directly with a transceiver. To accomplish this connection, the application on the wireless device will communicate with the device operating system to determine the appropriate transceiver. Once the identified transceiver has been returned to the application, the application may then directly transfer data to the identified transceiver. Thus, the operating system is not a necessary intermediary when application data is sent to the transceivers.

Figure 1:
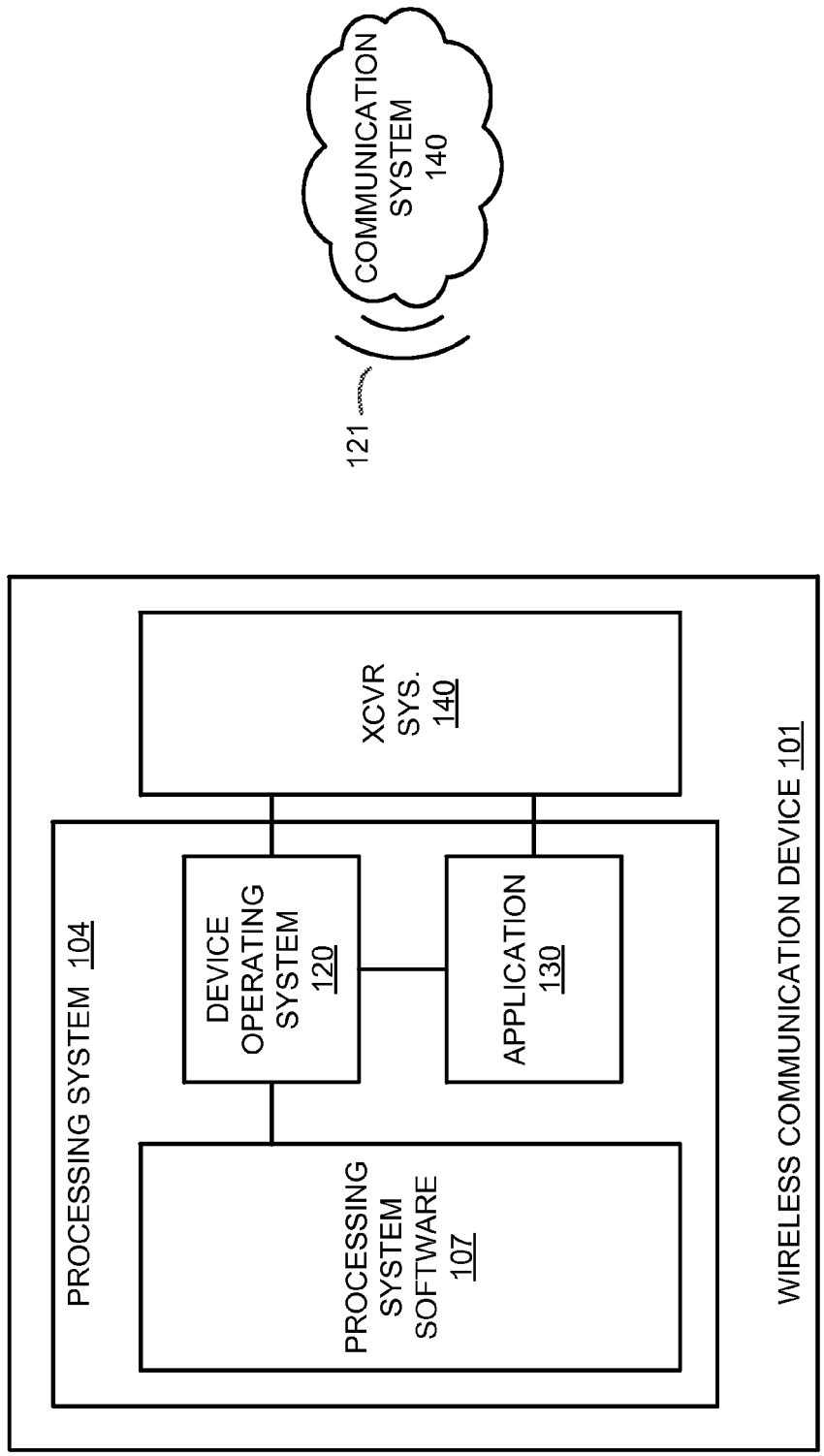
FIG. 1 illustrates a wireless communication system for application dedicated-transceiver communications.

Turning now to FIG. 1, FIG. 1 illustrates a wireless communication system 100 for application dedicated-transceiver communications. Wireless communication system 100 includes wireless communication device 101 and communication system 140. Wireless communication device 101 further includes transceiver system 140 and processing system 104, which provides processing system software 107, device operating system 120, and application 130. Wireless communication device 101 communicates with communication system 140 over wireless sector 121.

In operation, wireless communication device 101 may execute a variety of applications and software including processing system software 107 and application 130. Applications and software on wireless communication device 101 may include email applications, file sharing applications, news applications, amongst many other possible types of applications. Typically, when the application or software is executed on the device, the software is processed using a device operating system, such as device operating system 120. Device operating system 120 provides frameworks and other elements that allow the applications to work with the device hardware.

In some examples, the applications on wireless communication device 101 may require a communication that communicates using transceiver system 140. Transceiver system 140 includes various radio frequency and antenna elements that allow the device to communicate wirelessly with various base stations using an assortment of wireless communication formats. In the present example, application 130 is configured to communicate data with transceiver system 140 directly, without the application data being first passed through device operating system 120. To accomplish this task, application 130 will first request device operating system 120 to gather transceiver information from transceiver system 140. Device operating system 120 will then return a response to the application query indicating the proper connection between application 130 and transceiver system 140. Application 130 may then communicate directly with transceiver system 140 to transmit data without the use of device operating system 120.

In some examples, application 130 may be a secured application that attempts to avoid the use of device operating system 120 when transmitting or receiving data. In other instances, application 130 may be a preferred application that can quickly communicate with transceiver system 140 without the use of device operating system 120. Application 130 may be configured with operating software and circuitry elements to interact directly with transceiver system 140. As a result, transceiver system 140 may receive and process application data as though application 130 is an operating system passing the data to transceiver system 140.

Figure 2:
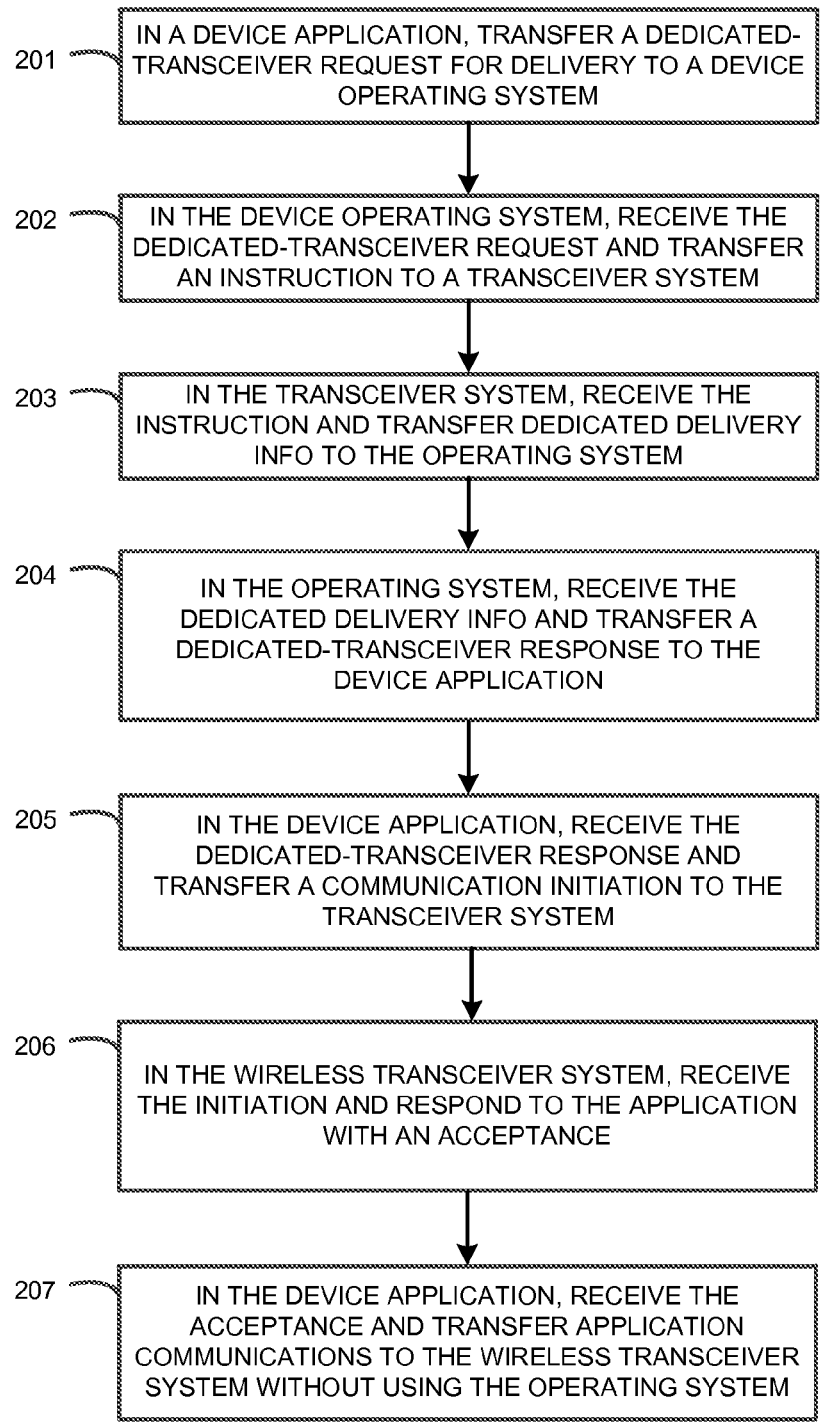
FIG. 2 illustrates a method of operating a wireless communication device to facilitate dedicated-transceiver communications.

To further illustrate the operation of wireless communication device 101, FIG. 2 is included. FIG. 2 illustrates a method of operating a wireless communication device to facilitate dedicated-transceiver communications. The method includes, in a device application, such as application 130, transferring a dedicated-transceiver request for delivery to device operating system 120 (201). In some examples, application 130 may include an application programming interface (API) to communicate with operating system 120. This API may include various commands and elements to allow application 130 to gather transceiver information using device operating system 120.

Once the dedicated-transceiver request has been transferred, device operating system 120 is configured to receive the request and transfer a dedicated-transceiver instruction to transceiver system 140 (202). This dedicated-transceiver instruction allows transceiver system 140 to scan and otherwise determine availability information for the various transceivers included within transceiver system 140. Availability information or data may include the signal strength for the possible communication networks, the signal to noise ratio for the various communication networks, security concerns for the various communication networks, amongst other possible availability information. In some examples, transceiver system 140 may include processing circuitry to determine the best transceiver for communication based at least on the dedicated-transceiver instruction and the availability data. In other examples, transceiver system 140 may allow device operating system 120 to determine the appropriate transceiver based on the availability data.

Upon receipt of the dedicated-transceiver instruction and determination of availability data, transceiver system 140 is configured to transfer dedicated-transceiver information for delivery device operating system 120 (203). In some instances, the dedicated-transceiver information may include an identified transceiver for application 130 based on the availability data. In other examples, the dedicated-transceiver information may include the availability data itself, which may allow operating system 120 to determine the appropriate transceiver for the communication.

Following the transfer of the dedicated-transceiver information, the method further includes receiving the dedicated-transceiver information at device operating system 120, and transferring a dedicated-transceiver response for delivery to application 130 (204). In some instances, this response may be formatted based on an API that promotes the interaction of application 130 and operating system 120. Thus, application 130 may query the operating system for a transceiver based on an API, and may expect a response from the operating system based on the same API.

Once the response is received by application 130, application 130 may then transmit a communication initiation directly to transceiver system 140 based on the response (205). By communicating with transceiver system 140 directly, application 130 no longer requires the operating system to make external communications over the wireless network. As a result, the communication may be faster and more secure in some examples.

In response to the initiation from application 130, transceiver system 140 is configured to set up the communication for application 130 and respond to application 130 indicating that the transceiver is ready for the communication (206). Based on this response, application 130 may then transfer application data directly to transceiver system 140 for communication across the appropriate communication network (207).

Figure 3:
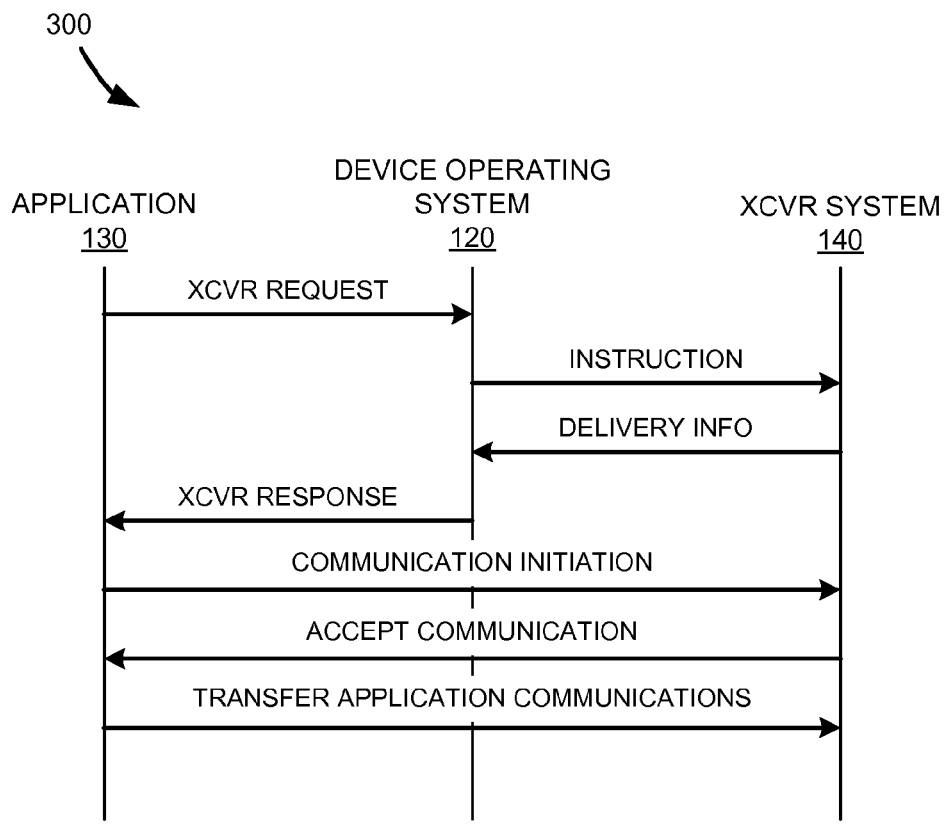
FIG. 3 illustrates a timing diagram for dedicated-transceiver communications on a wireless communication device.

Referring now to FIG. 3, FIG. 3 illustrates a timing diagram 300 for dedicated-transceiver communications on a wireless communication device. As illustrated in timing diagram 300, application 130 may require a communication across a wireless communication network. This communication may include a communication with another wireless communication device, a communication with a server connected to the network, or any other possible communication from the wireless communication device. Once a communication is required, application 130 will send a transceiver request to device operating system 120. Upon receipt of the transceiver request, device operating system 120 will deliver an instruction to transceiver system 140 to determine the appropriate transceiver for the communication.

In some examples, transceiver system 140 may determine availability data for the various networks accessible to the wireless communication device. Thus, transceiver system 140 may identify network conditions such as signal strength, signal to noise ratios, potential communication rates, amongst other possible availability data. Once the data is gathered by transceiver system 140, transceiver system 140 may then respond with delivery information to device operating system 120. This delivery information may include the availability data itself, or may include a specific transceiver for the communication in some examples.

Based on this delivery information, device operating system 120 is then configured to develop a transceiver response for application 130. In some examples, device operating system 120 may determine the appropriate transceiver for the application communication based on the delivery information passed by transceiver system 140. In other instances, device operating system 120 may be configured to pass the identified transceiver from transceiver system 140 to application 130.

In requesting the transceiver from device operating system 120, application 130 may use an application programming interface or API to interact with operating system 120. This API may provide functions or routines that specifically allow application 130 to determine a transceiver by communicating with device operating system 120. Further, these functions or routines may have a specified return for the function calls. Thus, if application 130 requested a transceiver using the API, device operating system 120 should return a transceiver response in an expected format for application 130.

In addition to the API between application 130 and device operating system 120, a second API may also be used between operating system 120 and transceiver system 140. This second API may be responsible for generating the instruction for transceiver system 140 and returning the delivery information to device operating system 120. By generating API functions between the two systems, both device operating system 120 and transceiver system 140 may be able to quickly recognize the requests and responses between the two systems.

Once the dedicated-transceiver response has been received by application 130 from device operating system 120, application 130 is further configured to initiate a communication with transceiver system 140. In some examples, this initiation may consist of a handshake between the application and the transceiver system, such that transceiver system 140 will verify the application and the communication. Once the communication is accepted, transceiver system 140 will then transfer an acceptance to application 130. Based on this acceptance, application 130 may then transfer application communications to transceiver system 140. By communicating directly with transceiver system 140, application 130 no longer requires operating system 120 to accomplish communications. Thus, application 130 has a more secure route to transceiver system 140.

Figure 4:
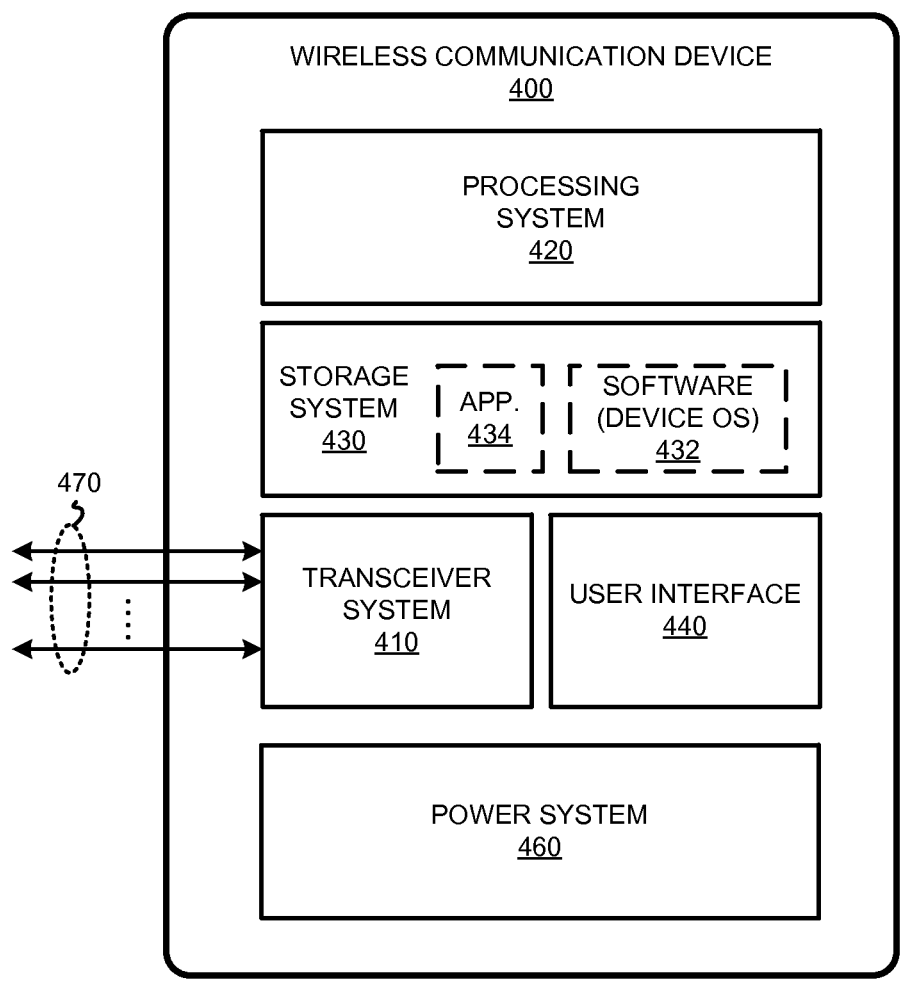
FIG. 4 illustrates a wireless communication device with dedicated-transceiver communication ability.

Turning now to FIG. 4, FIG. 4 illustrates a wireless communication device 400 with dedicated-transceiver communication ability. Wireless communication device 400 is an example of wireless communication device 101, although other examples of wireless communication device 101 are possible. Wireless communication device 400 includes transceiver system 410, processing system 420, storage system 430, user interface 440, and power system 460.

Transceiver system 410, processing system 420, storage system 430, user interface system 440, and power system 460 are communicatively coupled, and can communicate over associated discrete links, common busses, data links, power links, RF links, or other links. Wireless communication device 400 can be distributed or consolidated among equipment or circuitry that together forms the elements of wireless communication device 400. Wireless communication device 400 may optionally include additional devices, features, or functionality not discussed here for purposes of brevity.

Transceiver system 410 comprises one or more communication transceiver circuitry portions and communication interface circuitry for communicating over one or more communication links 470 with one or more communication networks. In some examples, transceiver system 410 includes wireless transceiver circuitry and antennas for communicating with base stations of a cellular voice and data network, among other communication networks. Transceiver system 410 could include radio transceiver equipment and antenna elements for wirelessly exchanging user communications and overhead communications over the associated ones of links 470, among further links. Links 470 could each use various protocols or communication formats such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format, including combinations, variations, or improvements thereof.

Processing system 420 may comprise one or more microprocessors and other circuitry that retrieves and executes software 432 and application 434 from storage system 430. Processing system 420 may be implemented within a single processing device, but may also be distributed across multiple processing devices or sub-systems that cooperate in executing program instructions. Examples of processing system 420 include general purpose central processing units, application specific processors, system-on-a-chip devices, and logic devices, as well as any other type of processing device, combinations, or variations thereof.

Storage system 430 may comprise any computer readable storage media or storage device readable by processing system 420 and capable of storing software 432 and application 434. Storage system 430 may include volatile and nonvolatile, removable and non-removable media implemented in any method or technology for storage of information, such as computer readable instructions, data structures, program modules, or other data. In addition to storage media, in some implementations storage system 430 may also include communication media over which software 432 or other data can be communicated. Storage system 430 may comprise additional elements, such as a controller, capable of communicating with processing system 420. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In operation, processing system 420 may be used to execute software 432, which includes a device operating system. The device operating system may be configured to manage the hardware and resources of wireless communication device 400 and provide common services to various applications such as application 434. Application 434 may be any application that requires a data communication over communication links 470. Such an application may include a weather application, a file sharing application, an email application, or any other similar data application. Once a communication is required by application 434, application 434 will inquire the device operating system to determine the proper transceiver connection for the communication. In turn, the device operating system will communicate with transceiver system 410 to determine the appropriate dedicated-transceiver. In some examples, transceiver system 410 may include software and circuitry to determine availability data for the various transceivers in transceiver system 410. This data may then be communicated back to the device operating system to determine the appropriate transceiver.

Once the availability data has been processed and a transceiver has been identified for the communication, a response to the transceiver query will be returned to application 434. This response may include the identity of the transceiver to be used, as well as any other information necessary to accomplish the communication. Upon receipt of the response, application 434 is then configured to communicate directly with transceiver system 410 without the use of the operating system. In some instances, application 434 may initiate a handshake procedure with transceiver system 410 to start the transfer of data communications between the application and the specific transceiver. Once the handshake is completed, application 434 will start transferring data communications directly to transceiver system 410.

In some examples, to communicate with transceiver 410 directly, application 434 may include software or hardware to facilitate the communication. This software or hardware may allow application 434 to communicate without the use of the device operating system. Thus, application 434 may be completely removed from the device operating system when a communication is required that uses transceiver system 410.

Power system 460 includes circuitry and a power source to provide power to the elements of wireless communication device 400. The power source could include a battery, solar cell, flywheel, capacitor, thermoelectric generator, chemical power source, dynamo, or other power source. In some examples, power system 460 receives power from an external source, such as a wall outlet or power adapter. Power system 460 also includes circuitry to condition, monitor, and distribute electrical power to the elements of wireless communication device 400.

User interface system 440 includes equipment and circuitry for receiving user input and control, such as for engaging in voice calls or data sessions, and receiving user instructions for text or video messages, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, global positioning systems, or other human-interface equipment. User interface system 440 also includes equipment to communicate information to a user of wireless communication device 400. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Returning to FIG. 1, wireless communication device 101 comprises processing system 104 and transceiver system 140. Processing system 104 further includes processing system software 107, device operating system 120, and application 130. Transceiver system 140 may include various radio transceivers, amplifiers, filters, modulators, wireless modules, and signal processing circuitry. Transceiver system 140 can be used to communicate over wireless sector 121. In some examples, transceiver system 140 can be communicatively coupled directly to application 130. Thus, instead of requiring the use of device operating system 120 to execute a communication, application 130 may communicate directly with transceiver system 140.

Processing system 104 may include processing circuitry and other elements to execute software such as processing system software 107, device operating system 120, and application 130. Processing system 104 may also include user interface systems, memory devices, non-transitory computer-readable storage mediums, software, processing circuitry, or some other communication components. Wireless communication device 101 may be a sensor device, user device, subscriber equipment, customer equipment, access terminal, wireless smartphone, computer, mobile Internet appliance, wireless network interface card, media player, game console, or some other communication apparatus, including combinations thereof.

Communication network 140 comprises communication and control systems for providing access to communication services for other devices and networks. Communication network 140 can each provide communication services including communication routing, link bridging, network communications, data exchange, or other communication services. In some examples, communication network 140 is a cellular voice and data network that can provide voice calls, text messages, data access, or other communication services provided over cellular or wireless communication networks. In some examples, communication network 140 includes equipment to provide wireless access to communication services within different coverage areas to user devices, route communications between content providers and user devices, and facilitate handoffs between equipment of different coverage areas, among other operations. Communication network 140 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Wireless sector 121 includes a wireless link that uses the air or space as the transport media. The wireless link may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device to facilitate dedicated-transceiver communications comprising:

in a device application, transferring a dedicated-transceiver request for delivery to a device operating system;

in the device operating system, receiving the dedicated-transceiver request, and in response, transferring a dedicated-transceiver instruction to a wireless transceiver system;

in the wireless transceiver system, receiving the dedicated-transceiver instruction, and in response, determining availability data for one or more transceivers in the wireless transceiver system, identifying a transceiver for the device application based on the availability data, and transferring dedicated-transceiver information that indicates the transceiver identified for the device application for delivery to the device operating system;

in the device operating system, receiving the dedicated-transceiver information, and in response, transferring a dedicated-transceiver response for delivery to the device application;

in the device application, receiving the dedicated-transceiver response, and in response, transferring a dedicated-transceiver initiation to the wireless transceiver system;

in the wireless transceiver system, receiving the dedicated-transceiver initiation, and in response, transferring a dedicated-transceiver acceptance for delivery to the device application; and in the device application, receiving the dedicated-transceiver acceptance, and in response, transferring application communications directly to the wireless transceiver system.

2. The method of claim 1 wherein transferring the dedicated-transceiver request for delivery to the device operating system comprises transferring, using an application programming interface, the dedicated-transceiver request for delivery to the device operating system.

3. The method of claim 2 wherein transferring the dedicated-transceiver response for delivery to the device application comprises transferring the dedicated transceiver response to the device application based on the application programming interface.

4. The method of claim 1 wherein transferring the dedicated-transceiver instruction to the wireless transceiver system comprises transferring, using an application programming interface, the dedicated-transceiver instruction to the wireless transceiver system.

5. The method of claim 1 wherein the device application is communicatively coupled to the wireless transceiver system.

6. The method of claim 1 further comprising:
in the wireless transceiver system, receiving the application communications, and in response, transmitting the application communications using a wireless communication format.

7. The method of claim 6 wherein the wireless communication format comprises Long Term Evolution format.

8. The method of claim 1 wherein the dedicated-transceiver response comprises at least an indication of the transceiver identified for the device application.

9. The method of claim 1 wherein the availability data for the one or more transceivers in the transceiver system comprises signal strength information.

10. The method of claim 1 wherein the dedicated-transceiver information comprises at least security information for one or more transceivers in the transceiver system.

11. A wireless communication device for secure communications comprising:
an application configured to communicate a dedicated-transceiver request to a device operating system, receive a dedicated-transceiver response from the device operating system, initiate a communication handshake with a transceiver system, and transfer secure application communications directly to the transceiver system;

the device operating system configured to receive the dedicated-transceiver request from the application, request dedicated-transceiver information from the transceiver system, receive the dedicated-transceiver information from the transceiver system, and communicate the dedicated-transceiver response to the application based on the dedicated-transceiver information; and the transceiver system configured to determine availability data for one or more transceivers in the transceiver system, identify a transceiver for the application based on the availability data, communicate the dedicated-transceiver information that indicates the transceiver identified for the device application to the device operating system, respond to the communication handshake from the application, and receive the secure application communications.

12. The wireless communication device of claim 11 wherein the application configured to communicate the dedicated-transceiver request to the device operating system is configured to communicate, using an application programming interface, the dedicated-transceiver request to the device operating system.

13. The wireless communication device of claim 12 wherein the device operating system configured to communicate the dedicated-transceiver response to the application is configured to communicate the dedicated-transceiver response to the application based on the application programming interface.

14. The wireless communication device of claim 11 wherein the device operating system configured to request dedicated-transceiver information from the transceiver system is configured to request dedicated-transceiver information from the transceiver system using an application programming interface.

15. The wireless communication device of claim 11 wherein the application is communicatively coupled to the transceiver system.

16. The wireless communication device of claim 11 wherein the transceiver system is further configured to transmit the secure application communications for the application using a wireless communication format.

17. The wireless communication device of claim 16 wherein the wireless communication format comprises Long Term Evolution format.

18. The wireless communication device of claim 11 wherein the dedicated-transceiver response comprises at least an indication of the transceiver identified for the application.

19. The wireless communication device of claim 11 wherein the availability data for the one or more transceivers in the transceiver system comprises signal strength information.

20. The wireless communication device of claim 11 wherein the dedicated-transceiver information comprises at least security information for one or more transceivers in the transceiver system.

* * * * *